United States Patent [19]
Wade et al.

[11] Patent Number: 5,613,075
[45] Date of Patent: Mar. 18, 1997

[54] METHOD AND APPARATUS FOR PROVIDING DETERMINISTIC READ ACCESS TO MAIN MEMORY IN A COMPUTER SYSTEM

[75] Inventors: Nicholas Wade, Folsom; Mark Lalich, Orangevale, both of Calif.; Bruce Young, Tigard, Oreg.

[73] Assignee: Intel Corporation, Santa Clara, Calif.

[21] Appl. No.: 585,598

[22] Filed: Jan. 12, 1996

Related U.S. Application Data

[63] Continuation of Ser. No. 151,260, Nov. 12, 1993, abandoned.

[51] Int. Cl.⁶ .................................................. G06F 13/00
[52] U.S. Cl. ........................... 395/287; 395/280; 395/292
[58] Field of Search .................................. 395/280, 287, 395/292

[56] References Cited

U.S. PATENT DOCUMENTS 4,953,081  8/1990  Feal et al. ......................... 364/200
4,972,313 11/1990  Getson, Jr. et al. .................. 364/200
5,168,568 12/1992  Thayer et al. ........................ 395/725
5,325,499  6/1994  Kummer et al. ...................... 395/425
5,327,570  7/1994  Foster et al. ........................ 395/800
5,379,384  1/1995  Solomon ............................. 395/325

Primary Examiner—Jack B. Harvey
Assistant Examiner—John Travis
Attorney, Agent, or Firm—Blakely, Sokoloff, Taylor & Zafman

[57] ABSTRACT

A method for guaranteeing access to a bus master for reads of main memory in a bridge circuit for joining a host processor, main memory, and a PCI bus, by detecting a read with data posted in the posted write buffer, disabling the posted write buffer, disabling access by the host processor for a selected period, detecting the presence of a retry of the read access, and enabling the posted write buffer after detecting an idle bus for the passage of the preselected time.

11 Claims, 4 Drawing Sheets

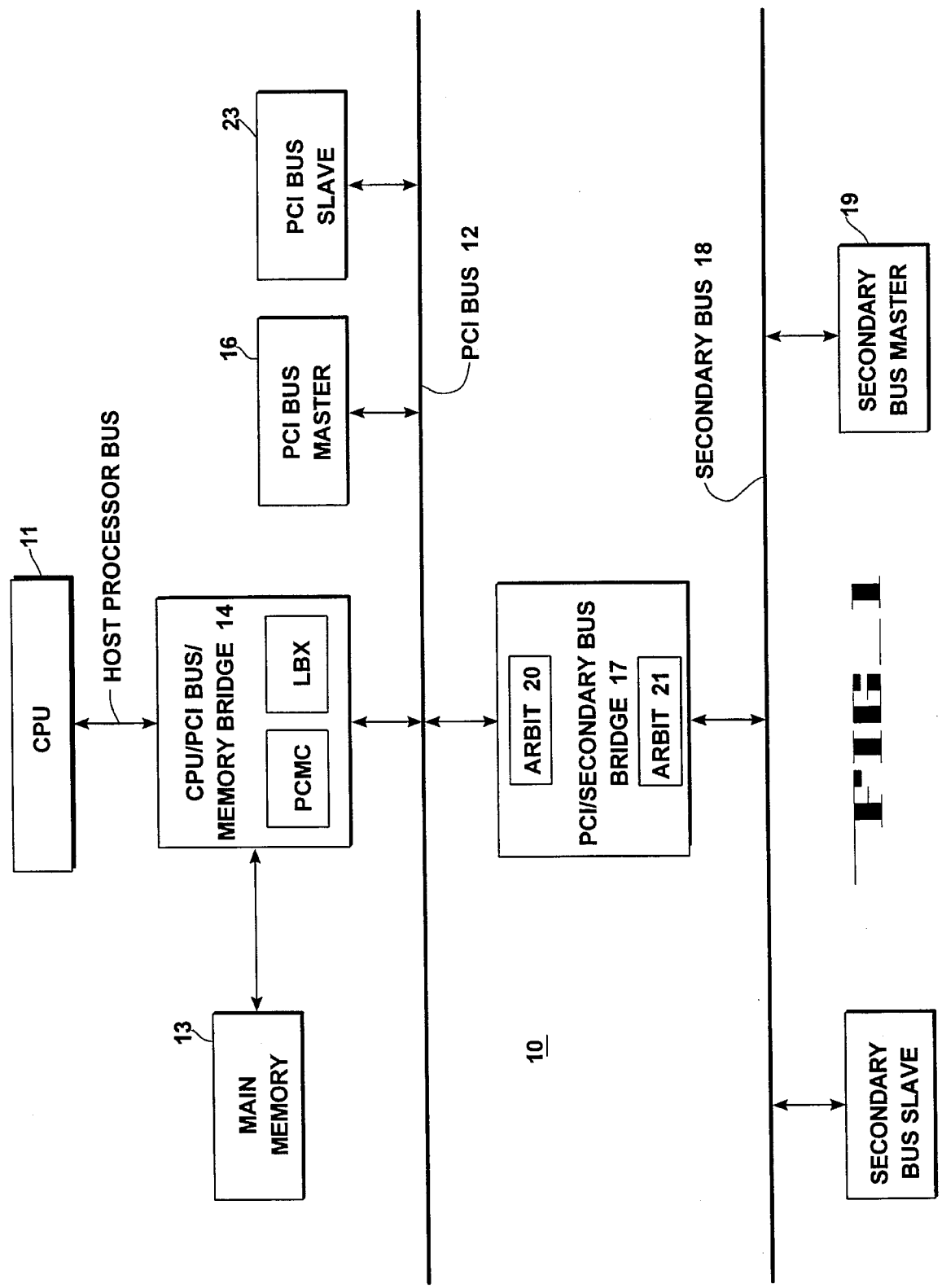
FIG_1

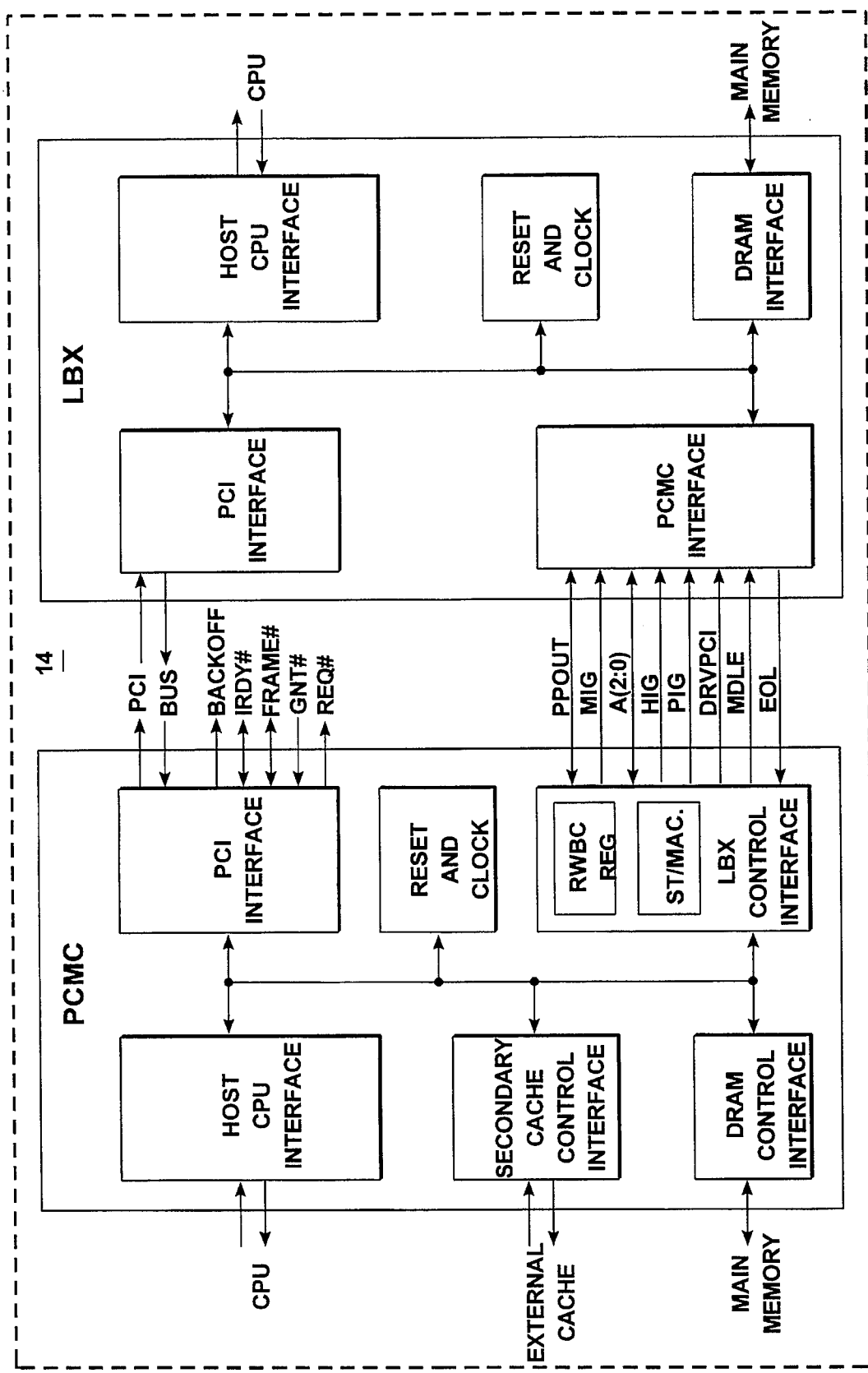
FIG_2

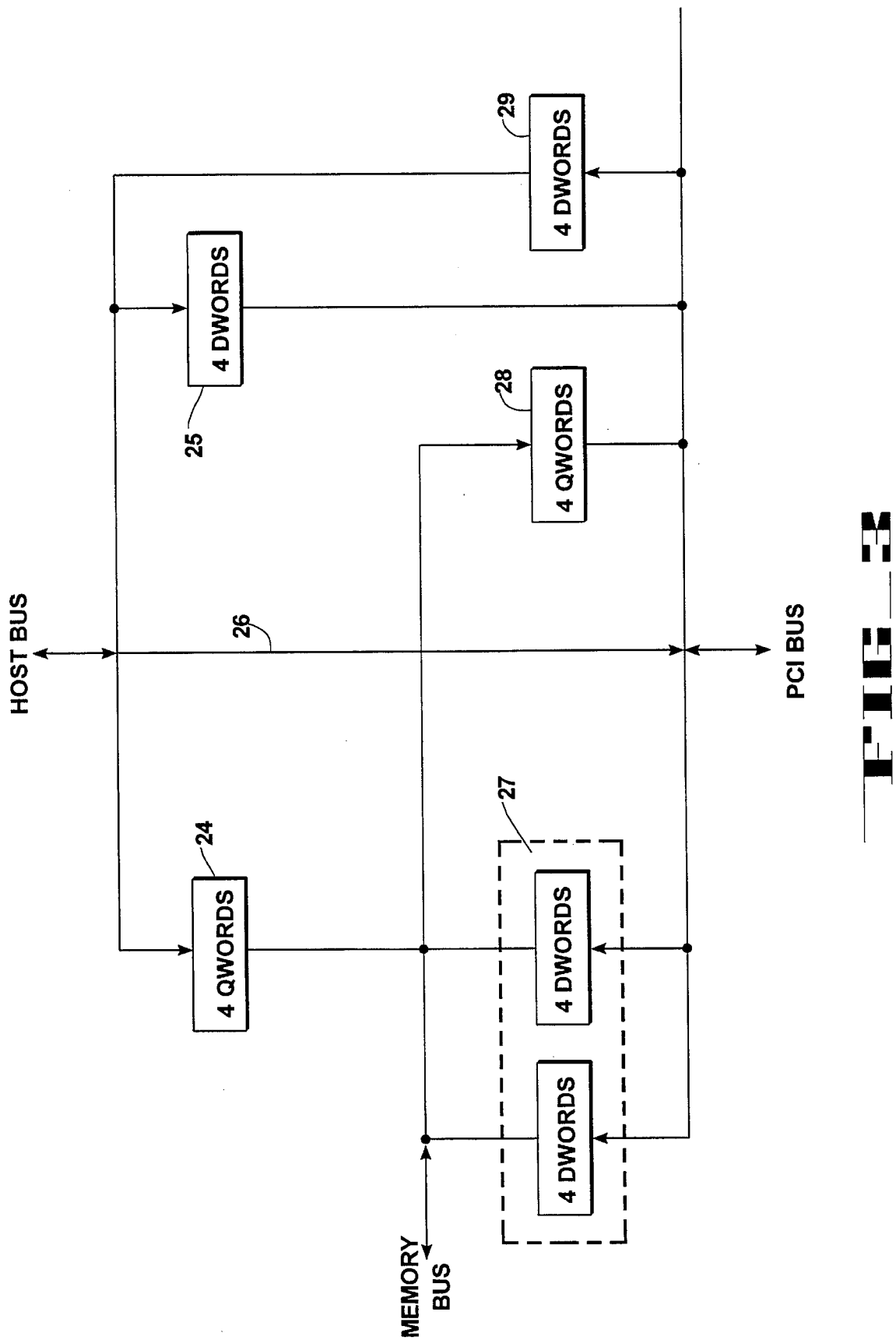
FIG_3

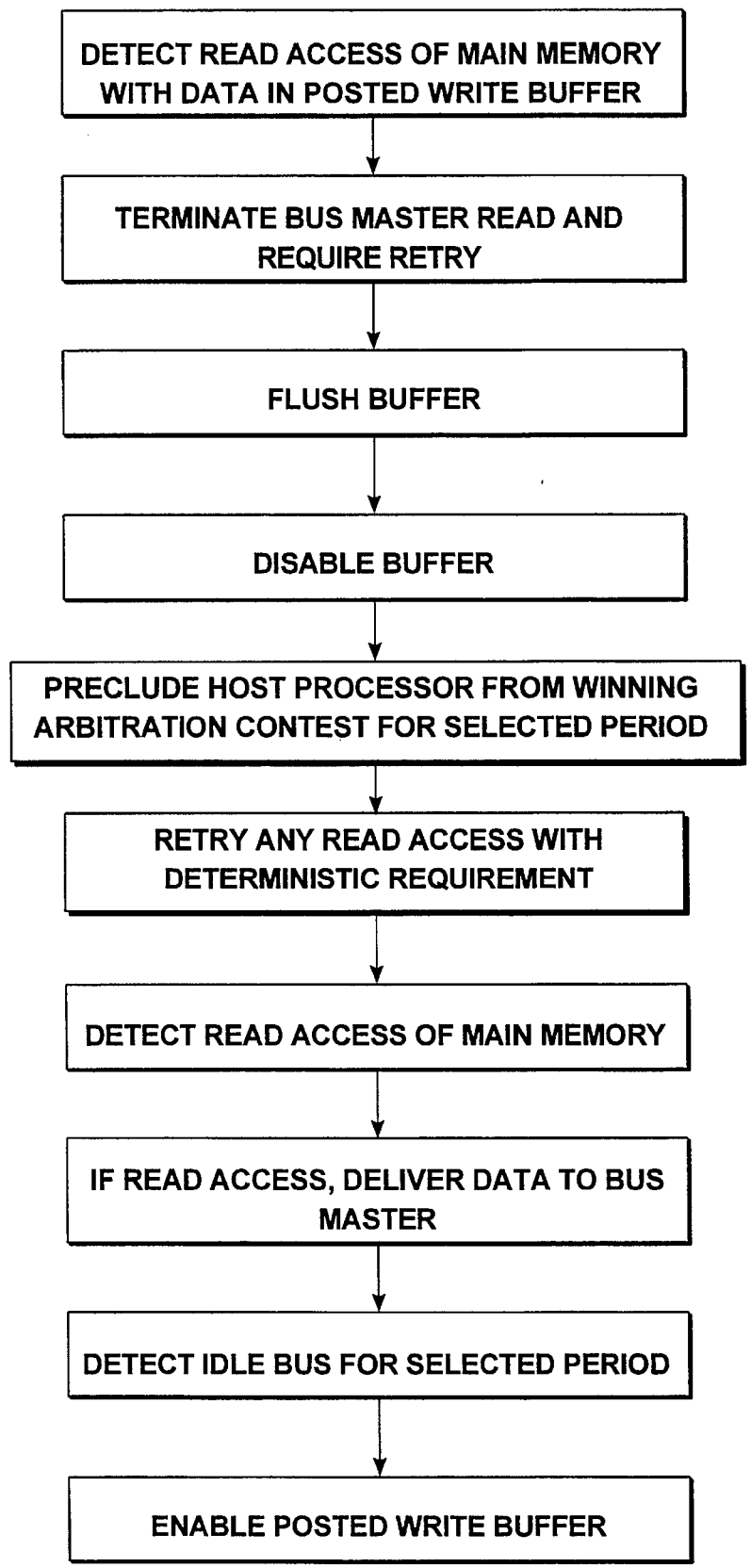
FIG_4

5,613,075

METHOD AND APPARATUS FOR PROVIDING DETERMINISTIC READ ACCESS TO MAIN MEMORY IN A COMPUTER SYSTEM

This is a continuation of application Ser. No. 08/151,260, filed Nov. 12, 1993, now abandoned.

BACKGROUND OF THE INVENTION

1. Field Of The Invention

This invention relates to computer systems, and more particularly, to methods and apparatus for providing deterministic read access to main memory in a computer system utilizing multiple buses.

2. History of the Prior Art

Historically, personal computers have utilized a single bus to transfer data between different internal components of the system. In personal computers using central processing units (CPUs) designed and manufactured by Intel Corporation of Santa Clara, Calif., such buses have typically been designed as either an Industry Standard Association (ISA) bus or an Expanded Industry Standard Association (EISA) bus. The ISA bus is a sixteen bit data bus while the EISA bus is thirty-two bits wide. Both the ISA bus and the EISA bus typically operate at a frequency just over eight megahertz. These bus widths and the rates at which each of these buses is capable of operating have limited the speed at which a computer can operate so there have been a number of attempts to increase bus speed.

One recently implemented method of increasing bus speed is to provide an additional, so called, "local bus" which is more closely associated with the central processor than either of the above-mentioned buses and which is capable of running at speeds closer to the speeds at which the central processor itself runs. Those system components which require faster operation than has been available using the slower buses (such as an output display card for driving an output display device) are joined to this faster local bus. The slower ISA or EISA bus is continued in essentially unchanged form as a secondary bus, and those components which are able to tolerate longer access times are associated with the slower bus. Although the theory behind using a local bus appears reasonable, many local bus designs have actually slowed in some respects the operation of the computers with which they are implemented.

Intel Corporation has designed a local bus which may be associated in a computer system both with an Intel processor and with other buses such as an ISA bus or an EISA bus (each of which is hereinafter referred to broadly as a secondary bus). This local bus is able to transfer data more rapidly for selected components of the system without the conflicts and bottlenecks which arise using other local bus systems. This bus is referred to as the "peripheral component interconnect" (PCI) bus. The PCI bus is thirty-two bits wide and is capable of operating at frequencies up to thirty-three megahertz.

A computer system using the PCI bus includes, in addition to the physical PCI bus conductors, a first bridge circuit which controls the transfer of data among the PCI bus, CPU main memory; and a second bridge circuit which controls the transfer of data between the secondary bus and the PCI bus. These bridges are necessary in order to synchronize the transfer of data where buses are operating at different data transfer rates. Thus, the arrangement is such that components on the PCI bus utilize the first bridge in transfers of data involving the central processor or main memory and the second bridge in transfers of data involving components on the secondary bus. On the other hand, components on the secondary bus utilize the second bridge circuit, the PCI bus, and the first bridge in transfers of data involving the central processor or main memory; and utilize the second bridge in transfers of data involving the components on the PCI bus.

Modern computer systems use bus masters to speed the operation of the system. A bus master is a component capable of originating and controlling the transfer of data on a bus. Typically a bus master includes its own processor and operates on its own internal clock. Bus masters may be associated with either the PCI bus or the secondary bus in a computer system using a PCI bus. A peculiarity of the architecture utilized in implementing the PCI bus is that there are situations in which it might be impossible for a PCI bus master desiring to read data from main memory to ever gain access to main memory to complete the read operation. It is desirable to provide a method and apparatus for eliminating such a condition.

SUMMARY OF THE INVENTION

It is, therefore, an object of the present invention to provide a method and apparatus for assuring that a bus master be able to gain access to main memory within some arbitrary time limit.

It is another, more specific, object of the present invention to guarantee read accesses to main memory by bus masters through the local bus processor/memory bridge within a predetermined time.

It is another, more particular, object of the present invention to guarantee read access to a PCI bus master within a predetermined period without the necessity of utilizing additional signals or circuitry to accomplish this purpose.

These and other objects of the present invention are realized in an apparatus and a method for guaranteeing access to a bus master for reads of main memory in a bridge circuit for joining a host processor, main memory, and a PCI bus, by detecting a read with data posted in the posted write buffer, disabling the posted write buffer, disabling access by the host processor for a selected period, detecting the presence of a retry of the read access, and enabling the posted write buffer after detecting an idle bus for the passage of the preselected time.

These and other objects and features of the invention will be better understood by reference to the detailed description which follows taken together with the drawings in which like elements are referred to by like designations throughout the several views.

BRIEF DESCRIPTION OF THE DRAWINGS

FIG. 1 is a block diagram of a computer system including a plurality of buses including at least a PCI bus and a secondary bus.

FIG. 2 is a block diagram of a first bridge circuit for connecting a central processor and main memory to a PCI bus.

FIG. 3 is a more detailed block diagram of a portion of the bridge circuit illustrated in FIG. 2.

FIG. 4 is a flow chart illustrating a method of practicing the present invention.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

Referring now to FIG. 1, there is illustrated a computer system 10. The system 10 includes a central processor (CPU or host processor) 11 such as an Intel i486 or Pentium™ microprocessor, or an equivalent data processing device which carries out the various instructions provided to the computer 10 for its operations. The central processor 11 is joined to a host processor bus which runs at the speed of the processor and connects to a bridge circuit 14. The bridge circuit 14 is adapted to provide various functions necessary to the transfer of data between the host processor bus and a local bus 12 adapted to carry information to various components of the system 10. The bus 12 is designed, in one embodiment, as a PCI bus to allow the transfer of data to and from the central processor 11 at a rate faster than is possible utilizing the typical ISA or EISA buses used by the prior art. Also joined to the PCI bus 12 by the bridge circuit 14 is main memory 13 which is typically constructed of dynamic random access memory (DRAM) arranged in a manner well known to those skilled in the prior art to store information during a period in which power is provided to the system 10.

The bridge circuit 14 may be physically constructed to include both a PCI/cache/memory controller (PCMC) integrated circuit chip (designated 82434LX by Intel Corporation) and two local bus accelerator (LBX) integrated circuit chips (designated 82433LX by Intel Corporation). Each of these chips is manufactured by Intel Corporation of Santa Clara, Calif.. Detailed descriptions of these integrated circuit chips are provided in 82430 PCIset Cache/Memory Subsystem, published by Intel Corporation. In addition to various functions such as cache control which are not important to the present invention, the bridge circuit 14 includes circuitry within the PCMC controller chip for controlling the transfer of data among the CPU 11, main memory 13, and the PCI bus 12. The bridge circuit 14 includes within the local bus accelerator chip a number of buffer circuits adapted to store read and write data being transferred among the central processor 11, the PCI bus 12, and main memory 13 so that the transfer between high and low speed components may be accomplished without delaying the high speed components. Because of these buffers, for example, a faster central processor may store in a posted write buffer data which is directed to a component on the PCI bus and continue to process other information while the bridge 14 is transferring the stored data to the slower PCI bus under control of the PCMC controller and a PCI bus arbiter.

Joined to the PCI bus 12 are various component circuits which are adapted to function at the transfer rate of that bus. For example, a PCI bus master circuit 16 may be connected to the PCI bus 12. The main properties of a PCI bus master are that it includes a microprocessor which functions at some internal clock rate and that it may initiate and control operations on the PCI bus 12 once it has gained access. A PCI slave circuit 23 may also be connected to the PCI bus 12. One such PCI slave circuit 23 may be a video output card with a frame buffer which is adapted to store video signals to be transferred to an output device such as an output display monitor. In fact, the very high transfer rate required to process the large mount of pixel data presented on modern output displays is one of the primary reasons for the use of local bus architectures.

Also connected to the PCI bus 12 is a PCI/secondary bus bridge circuit 17. The bridge circuit 17 performs the various functions necessary to transfer data between the PCI bus 12 and various component circuits joined to a secondary bus 18. The secondary bus 18 may be an ISA bus or a EISA bus which is capable of handling data at a slower transfer rate than is the PCI bus 12. Specific PCI to secondary bus bridge circuits which may carry out the functions of the circuit 17 are manufactured by Intel Corporation and described in detail in a publication entitled 82420/82430 PCIset ISA and EISA Bridges, published by Intel Corporation. Such a bridge 17 includes buffering circuits like those in the bridge 14 as well as circuitry for providing the interfaces between the PCI bus 12 and the secondary bus 18 so that data may be transferred therebetween. The bridge 17 provides circuitry which allows it to operate as an intercoupling bus master or a bus slave on the PCI bus 12. The ability of the bridge 17 to act as a PCI bus master allows a bus master circuit 19 positioned on the secondary bus 18 (for example, a direct memory access controller) to gain access to the PCI bus 12 and thence to the main memory 13. It should be noted that the integrated circuit chip which includes the bridge 17 also includes a first arbiter circuit 20 for controlling access to the PCI bus 12 and a second arbiter circuit 21 for controlling access to the secondary bus 18.

As was mentioned above, a primary reason for the use of bridge circuits is to synchronize the transfer of data between two buses which are functioning at different transfer rates. An Intel Pentium™ microprocessor, for example, may be transferring data to the host processor bus sixty-four bits at a time at a clock rate of 66 megahertz while the PCI bus is able to receive data only thirty-two bits at a time at a clock rate of 33 megahertz. Since the processor is transferring data four times as fast as the PCI bus is able to process that data, provision must be made for adjusting the data transfer rate to the correct value for each bus as well as for synchronizing the clock rates. Rather than requiring the host processor 11 to wait for the PCI bus 12 to complete each transfer, the bridges allow the faster host processor to transfer data addressed to the PCI bus to buffers from which the data may be retrieved more slowly by the PCI bus. Similar buffers are used in the bridge 14 for other types of transfers to and from main memory 13 and the PCI bus 12. This arrangement allows the processor to continue functioning at full speed without wait states and increases the overall operational speed of the system.

In order to assist in the use of such buffers, however, the control circuitry of the PCMC chip and the PCI arbitration circuitry implement a protocol for the PCI bus 12 by which operations by the host processor are typically given highest priority and write operations by the host processor which have been stored in a posted write buffer must be completed before read operations are allowed. This allows the host processor to post write data to the buffers of the bridge 14 and continue with other operations without waiting for the completion of the write operations. Requiring the completion of write operations from the posted write buffers before read operations may intervene assures that the posted data will not be lost and that invalid data will not be treated as valid.

One problem created by this method of operation is that without more it becomes impossible to know whether certain operations requested on the PCI bus 12 by PCI bus masters will ever be completed. In some situations data may be lost or severely delayed in delivery because of the necessity of implementing this protocol. For example, a local area network (LAN) typically transmits data on the network at a fixed rate. Consequently, it must be able to read data from main memory in a fixed amount of time in order to meet this rate. Thus, when a LAN controller acting as a bus master asserts a request to the PCI arbiter 20 to read from main memory 13, it is necessary for the LAN controller to be assured that it will complete its operation of transferring data from main memory within a specified period. Similarly, audio and full motion video data stored in main memory must be available within specified periods; or gaps in the sound will be produced and jerky motion will be displayed.

This need to assure that an operation on the PCI bus 12 will be carried out within a predetermined time is especially important for reads from main memory by a PCI bus master because of the protocol by which buffered writes from the host processor must be completed before any read operation is allowed. If the processor has posted write data to a bridge buffer directed to the PCI bus, the control circuitry of the PCMC will deny the PCI bus master read request directed to main memory by asserting a backoff signal. This signal informs the PCI bus master that it must retry its read request after some period of time. This period may be quite extensive because so much data may be placed in the posted write buffer by the processor. If after the denial of the request, the posted write buffer is finally cleared, the processor 11 or another PCI master may assert a request for the PCI bus before the retry by the retrying PCI bus master so that the PCI bus will again be occupied when the retry request is asserted. The request will again be denied and will prompt another retry. There is no guarantee that the retrying PCI bus master will be allowed on the bus. Ultimately, the read operation by the retrying PCI bus master may have to be aborted because of the inability of the bus master to gain access to main memory.

The invention assures that a PCI bus master will be able to complete its read operations on the PCI bus within a predetermined amount of time. More specifically, the invention guarantees read accesses to main memory by PCI masters through the PCI/host processor/memory bridge 14 within a predetermined time.

FIG. 2 is a block diagram which illustrates component circuits which are included within one embodiment of a bridge circuit 14. The circuit 14 includes a PCMC integrated circuit chip and two LBX integrated circuit chips, only one of which is illustrated. The PCMC chip has a host CPU interface circuit which transfers control signals between the processor 11 and the bridge 14, a PCI interface circuit which transfers control signals between the bridge 14 and the PCI bus 12, a secondary cache control circuit which interfaces with external cache circuitry (not illustrated), a DRAM control interface circuit which interfaces with the main memory 13, a reset and clock circuit which receives the clock signals provided by the various associated circuits and provides clock signals to those circuits, and an LBX control interface circuit. The PCI interface circuit includes one portion which functions as a PCI bus master for initiating transactions for the host processor on the PCI bus and another portion which responds to transactions on the PCI bus as a PCI bus slave circuit. The LBX control interface circuit includes circuitry for providing control signals to the local bus accelerator (LBX) to control the buffers in which data may be stored and other data paths during transfer of data among the main memory 13, the host processor, and the PCI bus 12. The LBX control interface circuitry includes among other circuit components, a buffer tracker circuit which keeps track of the state of the various buffers in the LBX chips.

Each LBX chip of the bridge circuit 14 also has a host CPU interface circuit which transfers data between the processor 11 and the bridge 14, a PCI interface circuit which transfers data between the bridge 14 and the PCI bus 12, a DRAM interface circuit which interfaces with the main memory 13 for the transfer of data, a reset and clock circuit which receives the clock signals provided by the various associated circuits and provides clock signals to those circuits, and a PCMC interface circuit. The PCMC interface circuit includes circuitry for receiving and providing control signals to the PCMC chip so that that chip may control the data buffers in which data may be stored and other data paths in the LBX during transfer of data among the main memory 13, the host processor, and the PCI bus 12.

The buffers and data paths referred to are distributed among the various components of the LBX circuitry. The host processor, main memory, and the various other circuit components joined to the PCI bus 12 may store data in these buffers during transfers of data. For example, a particular operation may be occurring under control of a PCI bus master when the processor 11 desires to write data to a device on the PCI bus. In such a case, the data from the processor may be stored in the buffers of the LBX circuitry until the host bus bridge 14 on behalf of the processor gains control of the PCI bus 12 through arbitration.

FIG. 3 illustrates the data buffers and other data paths provided by a pair of LBX circuits which may be utilized in accordance with the present invention. These buffers include a four quad word CPU-to-memory posted write buffer 24 used for cache write back by the CPU, a four double word CPU-to-PCI posted write buffer 25, a PCI-to-memory posted write buffer 27 capable of storing two consecutive sets of four double words, a PCI-to-memory read prefetch buffer 28 capable of storing four quad words, a four double word CPU-to-PCI read prefetch buffer 29, and a direct path 26 from the CPU to the PCI bus.

One of the functions of the circuitry of the PCMC chip of the bridge 14 and the arbiter 20 illustrated in FIG. 1 is to provide control by which any write from the host processor 11 which has been posted to the posted write buffer 25 in the LBX circuit of the bridge 14 is completed before a read of main memory through that bridge 14 by any other PCI bus master is allowed. This order of procedure, called strong write ordering, is followed because it is possible for the host processor to have written data using the buffer 25 to some address on the PCI bus and to have stored a flag in main memory indicating that the data is valid while some portion of the data is still in the buffer 25 in the bridge circuit. Since the data is in the buffer 25 rather than its addressed destination, the data at the destination is not, in fact, valid when the flag is read by another bus master. The bridge 14 and the PCI bus arbiter 20 are able to perform this and various other functions in order to see that the rules of data transfer are adhered to so that a plurality of processors may concurrently utilize the PCI bus.

The enforcement of this rule of operation causes the problem discussed above in a case in which a PCI bus master desires to read from main memory and data has been posted to the posted write buffer 25 by the host processor. When a PCI master desires to read from main memory and data is posted in the buffer 25, the control circuitry of the PCMC receives the request for the PCI bus 12 and refuses the request by asserting a backoff signal. In general, this is accomplished by the PCI bus slave unit of the PCI interface circuitry. The slave unit monitors the status of the posted write buffer maintained by the buffer tracker circuit and sends a retry when it detects a PCI bus master read with the posted write buffer not empty. This causes the PCI bus master to retry the read access after some period. During this period, it is incumbent upon the PCMC control circuitry and the arbiter 20 to complete the write of the data posted in the buffer 25 to its proper address, an operation known as flushing. At the completion of the write operation, the buffer 25 is empty so that a read operation should be available to the retrying PCI bus master. However, it is possible for the host processor to itself request access before the retry occurs. Since the PCI bus master requesting a read operation has been caused to relinquish the PCI bus, the requests by the host processor will allow the host processor to again gain access; and the later retry request will be denied. This condition may continue indefinitely.

Consequently, it is desirable to provide an arrangement by which the retrying bus master may be guaranteed access to read from main memory within a predetermined time and the posted write buffer 25 may be turned back on as soon as this has been accomplished to allow the host processor to regain its speed advantage. It would seem that this could be accomplished by simply having the PCI bus arbiter 20 test the condition of the various bus masters to determine when the retrying bus master has accomplished its access and then turn the buffer 25 back on. However, the arbiter 20 does not reside in and is not a part of the bridge 14. Consequently, to accomplish this purpose would require snooping circuitry in the bridge 14 to determine the state of requests from all of the bus masters on the PCI bus. This circuitry would substantially complicate the system.

Instead the present invention provides a unique method and apparatus which provides desired result. This method is described in the flow chart of FIG. 4. In order to allow read access by the retrying bus master, the present invention causes the posted write buffer 25 to be disabled for additional writes from the host processor 11. The PCI bus slave unit of the PCI interface circuit initiates the flushing in response to the read request. Disabling the buffer 25 is accomplished at the end of the process of flushing the buffer 25 by a bit in a control register which is a part of the PCMC circuitry; with this bit in a logical "1" one state, the host processor may not post data to the buffer 25. Since the host processor may not post data to the buffer 25, once the buffer 25 has been flushed, a retry by the PCI bus master should allow read access of main memory by that PCI bus master. Therefore one would assume that all the system need do is deny buffer access to the host processor and wait for a read access. Once a read access by a PCI bus master reading from main memory occurs, it should also be possible to turn back on the buffer 25 in order to speed operations by the processor. It should be noted that when the host processor is kept from using the posted write buffer, it is not precluded from using the bridge 14. However, it is forced to use the direct path 26 to the PCI bus. The use of this path does not create the problem of a valid flag being posted for data still in a buffer so this type of operation is allowed. However, since the process is not buffered, the need to transfer data at a speed acceptable to the PCI bus slows operations by the host processor to the speed of PCI bus. Thus, the host must operate using wait states to match the PCI bus transfer rate and loses its speed advantage.

However, this solution does not, in fact, solve the entire problem. It is possible that another PCI master will have requested and will have gained access to the PCI bus for a read operation before the retry by the first PCI bus master. Consequently, when the bus master retrying its request asserts its retry request, it will again be forced off the PCI bus and required to again retry the access. If the second bus master completes its operation and the buffer 25 is then enabled, then the host processor may write more data to the buffer 25 before the retry by the retrying PCI bus master occurs. When the retry occurs, the buffer 25 may again have to be flushed and disabled while the retrying PCI bus master is again backed off. This "ping-ponging" effect may continue to occur before the retry may again occur so that there is no guarantee that the retrying bus master will ever gain access to main memory. The present invention takes a number of steps in order to overcome this ping-ponging problem. First, a PCI bus master which is forced to retry an access must, if it desires to guarantee that it will gain access within a predetermined time, retry within a limited number of clock periods. In one embodiment of the invention, this time is two clock periods. Second, the bridge 14 simply tests to determine whether the PCI bus is idle and whether a time sufficient to allow a retry given within the prescribed time has passed. Any retry within the prescribed period will secure the PCI bus for the read access of main memory. If no retry has occurred, then the buffer 25 is enabled. The absence of a retry demonstrates that a predetermined time for access is not required by the PCI bus master.

However, a problem still exists. As explained above, when the host processor is kept from using the posted write buffer, it is not precluded from using the bridge 14. Instead, it is forced to use the direct path 26 to the PCI bus. The host processor must still use the bridge 14 to arbitrate for the PCI bus to gain access but its request has the highest priority. However, since operations by the host processor using the direct path 26 can occur immediately after the retrying PCI bus master is forced off the PCI bus, if the host processor attempts a series of accesses it will constantly gain the bus so the bus will not be idle. Consequently, there will be no failure of requests to create the idle state of the PCI bus. Therefore, the host processor will be unable to regain use of the buffer 25 since the buffer 25 cannot be turned back on.

To solve this problem, the host processor must somehow be kept from winning access to the PCI bus for a period sufficient to allow the retrying PCI bus master to gain access to the PCI bus and main memory. This overcomes the problem posed by the host processor seeking access to the PCI bus using the direct path 26. The way in which this is accomplished is by a change in the arbitration algorithm practiced by the arbiter 20.

In order to assure that the host processor is kept from winning an arbitration for the PCI bus when another PCI bus master is told to retry its read access by the PCMC circuitry and access to the buffer 25 is denied to the host processor, the arbiter 20 is caused in one embodiment to implement an algorithm which treats every PCI bus master desiring access to the bus fairly. An example of this is a round robin algorithm in which immediately after gaining access to a bus, the priority of the component gaining access is reduced to a value lower than that of the other components which might be attempting access. Thus, for example, if the bridge 14 is granted access to the PCI bus 12 by the arbiter 20 in order to complete the flush of the buffer 25, the priority of requests by the processor 11 using the bridge 14 is dropped to some value lower than that of a PCI bus master retrying its request. Thus, the request by the PCI bus master will have a higher priority than requests by the bridge 14 acting for the processor 11; and the PCI bus master will usually gain access to the bus. This, of course, does not necessarily allow the PCI bus master retrying its read to gain access since another PCI master may intrude and gain access. However, the arbitration algorithm will also reduce the priority of that PCI master after its access so that finally, the retrying bus master will gain priority.

It should be noted that the algorithm for allowing access by the retrying bus master does not slow the overall operation of the system because it is structured so that a PCI bus master which requires a determined time in which to gain access to the bus must retry within a very short period of time. For example, if a retry is required within two clock periods of a backoff signal to the bus master, then when the operation on the PCI bus is completed, the read access will be immediately retried; and, if the aforementioned round robin type of algorithm is used, the PCI bus master retry will ultimately be successful.

A second method of assuring that the retrying bus master gains read access in a case in which a normal arbitration algorithm is utilized is to require a bus master relinquishing access to the bus to assert no additional requests for the bus for a specified number of clock periods while simultaneously requiring a retrying bus master to reassert its request within the specified number of clock periods. This also will allow a retrying bus master to ultimately gain access to the PCI bus for a read to memory. If a bus master does not need to be sure that it can get on o the bus within any particular period, then that bus master need not worry about retrying within the window period in which it can be sure of gaining access.

Using either of these methods of fair arbitration and requiring that a retrying PCI bus master retry within a preselected period allows that time at which the posted write buffer should be turned back on to be determined in a number of different ways. In order to determine when the buffer 25 should be turned back on using the arbitration methods described, the PCMC control circuitry may determine by simply looking at its own accesses that the bus is idle and that there is no deterministic requirement by a retrying bus master. If the PCMC circuitry of the bridge 14 determines that the bridge 14 has, as a bus master, gained access to the bus twice in a row, then the PCMC control circuitry recognizes that there are no other requests for the bus than its own requests made for the host processor and simply turns the buffer 25 back on. A second method of turning the buffer 25 back on is for the PCMC circuitry of the bridge 14 to observe that no other PCI master is requesting the bus for some predetermined time period sufficient to allow the retrying bus master to gain read access (five clocks in one embodiment), then there can be no PCI bus master which has a deterministic requirement retrying its request. The lack of a request can be determined by the PCMC circuitry reviewing the FRAME# and IRDY# signals. The FRAME# and IRDY# signals are both generated by a PCI bus master whenever the bus master has access to the PCI bus. If FRAME# and IRDY# signals are both deasserted (held high) for some period of time such as five clock periods, then the PCI bus is idle; and the bridge 14 turns the buffer 25 back on. Another method of determining that the bus is idle for the specified period is for the PCMC circuitry of the bridge 14 to detect that the bridge 14 has received a bus access grant without having asserted a request; this is referred to as a "bus parking." Each PCI bus master asserts a REQ# signal when it desires access to the PCI bus 12; and the arbiter 20 sends a GNT# signal to grant the request. The PCMC circuitry may thus detect an idle condition by detecting a GNT# signal without the assertion of a REQ# signal. Each of these idle detection arrangements may be implemented by state machine circuitry in the PCMC circuitry (preferably the LBX control interface) designed to monitored the specified signals and produced an enabling output signal in a manner well known to those skilled in the prior art. In one embodiment, all of the different idle detection arrangements might be implemented.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method of operating a computer system having a host processor and a main memory coupled to a local bus through a bridge circuit, the computer system further having a bus master and a bus arbiter coupled to the local bus, the method comprising the steps of:

(a) posting write data to the main memory in a buffer of the bridge circuit by the host processor;

(b) accessing the main memory through the local bus by the bus master to read data from the main memory;

(c) instructing the bus master not to proceed further with its main memory access by the bridge circuit if the buffer contains posted write data;

(d) flushing the posted write data in the buffer by the bridge circuit upon instructing the bus master not to proceed further with its main memory access;

(e) keeping the buffer disabled by the bridge circuit even after flushing the buffer to ensure the blocked bus master will not be blocked again because of posted write data in the buffer when the blocked bus master retries the desired read;

(f) retrying the desired read again through the local bus by the blocked bus master, the retry being made by the blocked bus master within a predetermined time period that guarantees access to the main memory by the retrying bus master over any other non-host processor bus master of the computer system coupled to the local bus;

(g) arbitrating access to the local bus by the bus arbiter in a manner that guarantees access to the local bus will be eventually granted to the retrying bus master over the host processor;

(h) monitoring by the bridge circuit for a predetermined event indicative of retry no longer being made by the blocked bus master; and (i) reenabling the write buffer for the host processor by the bridge circuit upon detecting the predetermined event.

2. The method according to claim 1 wherein step (g) comprises the step of:

reducing the bus arbitration priority of the host processor to a level lower than that of the retrying bus master.

3. The method according to claim 1 wherein step (f) comprises the steps of:

relinquishing the local bus by the blocked bus master; and requiring all other non-processor bus masters coupled to the local bus not making any main memory access for the predetermined time period.

4. The method according to either claim 2 or 3 wherein step (h) comprises the step of:

determining by the bridge circuit that the local bus is idle by monitoring at least one bus master-generated signal for a selected period.

5. The method according to claim 4 wherein the local bus comprises a peripheral component interconnect (PCI) bus.

6. A computer system comprising:

a host central processing unit (CPU);

a local bus;

a main memory;

a first bridge circuit coupling the host CPU to the main memory and to the local bus, the first bridge circuit including a write buffer;

a first bus master coupled to the local bus, the first bus master arbitrating for access to the local bus to initiate and control operations on the local bus;

a secondary bus;

a second bridge circuit for transferring data therebetween the local and the secondary bus, the second bridge circuit including an arbitration circuit which controls access to the local bus in accordance with an arbitration algorithm;

the first bridge circuit further including a controller which asserts a back-off signal when the bus master requests a read access to the main memory through the local bus and the write buffer is posted with write data from the host CPU, the bus master responding to the back-off signal by retrying the read access within a certain period that guarantees the retrying bus master access to the main memory over any other non-CPU bus masters coupled to either the local or the secondary bus, the controller and arbitration circuit operating to flush the data in the write buffer and keeping the write buffer disabled even after the flush to ensure the blocked bus master will not be blocked again because of posted write data in the write buffer when the blocked bus master retries the desired main memory access, the flushing operation causing the requesting priority of the host CPU to drop to a level lower than that of the retrying bus master in accordance with the arbitration algorithm to endure access to the local bus by the retrying bus master over the host CPU; and the bridge circuit further including signal monitoring means for detecting an idle condition on the local bus resulted from the bus master no longer making retry, the idle condition causing the write buffer to be reenabled for the host CPU.

7. The computer system of claim 6 wherein the signal monitoring means comprises first and second bus master generated signals, the idle condition resulting when the first and second bus master generated signals are deasserted for a selected time.

8. The computer system of claim 6 wherein the signal monitoring means comprises a bus master-generated signal and an arbitration circuit-generated signal, the idle condition resulting when the arbitration circuit-generated signal is detected without the assertion of the bus master-generated signal.

9. The computer system of either claim 7 or 8 wherein the arbitration algorithm comprises a round robin algorithm.

10. The computer system of claim 9 wherein the local bus comprises a peripheral component interface (PCI) bus.

11. The computer system of claim 10 wherein the secondary bus comprises either an industrial standard association (ISA) bus or an expanded industry standard association (EISA) bus.

\* \* \* \* \*

UNITED STATES PATENT AND TRADEMARK OFFICE
CERTIFICATE OF CORRECTION

PATENT NO. : 5,613,075

DATED : March 18, 1997

INVENTOR(S) : Wade et al.

It is certified that error appears in the above-identified patent and that said Letters Patent is hereby corrected as shown below:

In column 12 at line 16 delete "endure" and insert --ensure--

Signed and Sealed this

Twenty-sixth Day of August, 1997

Attest:

BRUCE LEHMAN

Attesting Officer

Commissioner of Patents and Trademarks